United States Patent Office 3,255,217
Patented June 7, 1966

3,255,217
3β-METHOXY-ANDROSTANE-16β,17β-DIOL CYCLOBORATE
Max N. Huffman, Colorado Springs, Colo.
(629 N. 27th St., Omaha, Nebr. 68131)
No Drawing. Filed Nov. 6, 1963, Ser. No. 321,687
2 Claims. (Cl. 260—397.5)

This invention relates to steroid cycloborates. In particular, it relates to steroid 16β,17β-diol cycloborates of the following general formula

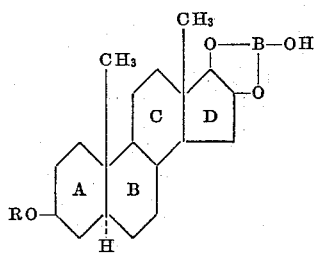

wherein R is a member of the group consisting of hydrogen and a loweralkyl radical.

The steroid 16β,17β-diol cycloborates which comprise this invention have useful physiological properties. Compounds of this invention have powerful stimulative effects on the reticulo-endothelial system. For instance, androstane-3-β,16β,17β-triol 16, 17-cycloborate is a powerful stimulator of the reticulo-endothelial system without any other hormonal effect.

The reticulo-endothelial system plays an important part in cholesterol metabolism. Cholesterol-containing macromolecular aggregates appear to be phagocytosed by cells of the reticulo-endothelial system. Stimulation of the reticulo-endothelial system accelerates the reduction in blood cholesterol levels.

It is an object of this invention to provide steroids which strongly stimulate the activity of the reticulo-endothelial system and yet have no hormonal effects. It is another object of this invention to provide efficient methods for producing such steroids.

The steroid cycloborates which comprise this invention are produced in a sequence of organic reactions in which ring D only of the steroidal formulas is here presented as follows:

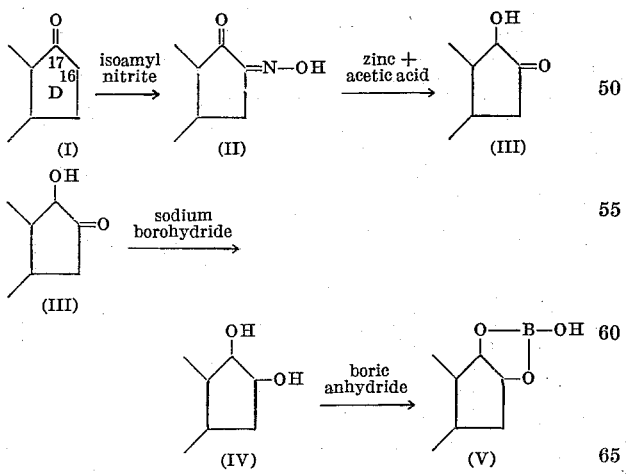

In this sequence of organic reactions a 17-keto-steroid (I) is nitrosated with isoamyl nitrite in tertiary butanol in the presence of potassium tertiary butoxide to provide a 16-oximino steroid (II). A 16-oximino steroid (II) is reduced by zinc dust in boiling acetic acid to produce a 16-keto-17β-hydroxy steroid (III). A 16-keto-17β-hydroxy steroid is further reduced by sodium borohydride or potassium borohydride to produce a 16-β,17β-dihydroxy steroid (IV), which may be purified through its acetonide if desired. This sequence of organic reactions to the point of Formula IV is similar to the sequence described in my U.S. Patent 3,002,983. A 16β,17β-dihydroxy steroid (IV) is finally converted to a 16β,17β-dihydroxy steroid cycloborate (V) by refluxing with boric anhydride in anhydrous thiophene-free benzene and absolute ethanol or dimethoxyethane ether desiccating conditions. The crystalline steroid 16β,17β-diol cycloborate may be obtained by diluting the reaction solvent with ethyl ether, washing with water, and distillation of the immiscible organic phase to dryness. Recrystallization of the crystalline residue from methylene chloride-hexane may be employed for purification. In this sequence of organic reactions a steroid bearing one double bond may be reduced to the fully saturated androstane configuration by hydrogenating with hydrogen and palladium-on-charcoal catalyst at the point of steroid Formula I or steroid Formula IV.

The easily obtainable steroid dehydroisoandrosterone may serve as a starting material for any of the compounds which comprise this invention.

The invention is disclosed in further detail by means of the following examples which are provided merely for the purpose of illustrating the invention. It will be appreciated by those skilled in the art that numerous modifications in equivalent materials and operating conditions can be made without departing from the invention as disclosed herein.

EXAMPLE 1

3β-methoxy-androstane-16β,17β-diol cycloborate

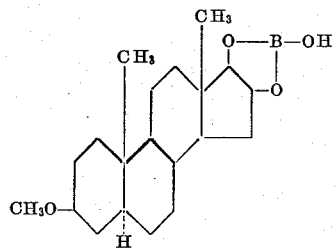

The starting material, 3β-methoxy-5-androsten-17-one, was obtained from dehydroisoandrosterone by the method described by Huffman and Sadler in the "Journal of Organic Chemistry," pages 919–927 of volume 18 for the year 1953.

44.6 g. of 3β-methoxy-5-androsten-17-one were stirred for 3 hours in 2,000 ml. of a solution of potassium tertiary butoxide in tertiary butyl alcohol (of a concentration of 4.4 g. of potassium in 180 ml. of anhydrous tertiary butyl alcohol) containing a total of 32 ml. of isoamyl nitrite (added in two equal portions—one at the start and the remainder after 1.5 hours). Then 64 ml. of 2-butanone were added and the mixture stirred for 30 minutes. The mixture was diluted with 15 liters of ice water and acidified with dilute sulfuric acid. The precipitate of 3β-methoxy-16-oximino-5-androsten-17-one was removed by filtration and washed well with water.

The 3β-methoxy-16-oximino-5-androsten-17-one was reduced with 120 g. of zinc dust in 2,880 ml. of boiling 50% acetic acid over a period of 1.75 hours. The hot reaction mixture was filtered from the zinc through glass wool and the residual zinc washed with 120 ml. of hot 50% acetic acid. The combined filtrates were cooled and then diluted with 8 liters of water. After refrigeration the 3β-methoxy-17β-hydroxy-5-androsten-16-one was collected on a filter and washed thoroughly with water.

The crude 3β-methoxy-17β-hydroxy-5-androsten-16-one in 3,000 ml. of methanol was reduced with 9.4 g. of sodium borohydride for one hour at the ambient temperature. Acetone (80 ml.) was then added and the mixture allowed to stand for fifteen minutes after which time it was heated to the reflux temperature, 750 ml. of 1.2 molar phosphoric acid added, and the resulting mixture heated under reflux for thirty minutes. Hot water (250 ml.) was added and the solution distilled to crystallization and then refrigerated. The crude 3β-methoxy-5-androstene-16β,17β-diol was filtered, washed with chilled 30% methanol, and washed thoroughly with water and dried.

The 3β-methoxy-5-androstene-16β,17β-diol was purified through the 16,17-acetonide derivative as follows: to 38.54 g. of 3β-methoxy-5-androstene-16β,17β-diol in 1,712 ml. of anhydrous acetone were added 18.4 ml. of concentrated sulfuric acid with good swirling, the flask stoppered and allowed to stand at room temperature for 40 min. Then 2,080 ml. of a solution of 8% potassium carbonate were added and the mixture diluted with 16 liters of ice water and refrigerated. The precipitate was filtered, washed copiously with water and dried. The acetonide derivative was crystallized from 1,150 ml. of 87% methanol which contained 0.3% potassium hydroxide. The crystalline 3β-methoxy-5-androstene-16β,17β-diol acetomide (26.2 g.; M.P. 144–145°) was dissolved in 1,250 ml. of 95% ethanol plus 282 ml. of 1.2 molar phosphoric acid and hydrolyzed by heating under reflux for 45 minutes. Water (1,500 ml.) was added and the mixture distilled to crystallization and refrigerated. The 3β-methoxy-5-androstene-16β,17β-diol was filtered, washed well with water and dried to yield 24.35 g. of product having a M.P. 179–179.5°.

A solution of 6.0 g. 3β-methoxy-5-androstene-16β,17β-diol in 225 ml. of 95% ethanol was reduced in a hydrogen atmosphere at 19.0 p.s.i.g. using 5% palladium on charcoal as catalyst. The solution of 3β-methoxy-androstane-16β,17β-diol was filtered from the catalyst, 250 ml. water added to the filtrate, the solution concentrated by distillation to induce crystallization and the mixture refrigerated. The product was collected on a filter and dried to yield 4.9 g. of 3β-methoxy-androstane-16β,17β-diol having a M.P. 185.5–186.5°.

To a solution of 4.9 g. of 3β-methoxy-androstane-16β,17β-diol in 250 ml. of dry ethyleneglycol dimethyl ether and 250 ml. of anhydrous thiophene-free benzene were added 50 g. of boric anhydride and the resulting mixture heated at reflux under anhydrous conditions for 20 hours in such a manner that the condensate was passed through anhydrous calcium sulfate before returning to the reaction. The reaction mixture was concentrated to approximately one half the original volume, then poured into 400 ml. of water and the aqueous mixture extracted with 1,000 ml. of diethyl ether. The ether extract was washed several times with 250 ml. portions of water and dried over anhydrous sodium sulfate. Evaporation of the ether left a crystalline residue which after two crystallizations from methylene chloride-hexane (containing a few drops of pyridine) yielded 3β-methoxy-androstane-16β,17β-diol cycloborate decomposing between 285–290°.

EXAMPLE 2

*3β-ethoxy-androstane-16β,17β-diol cycloborate*

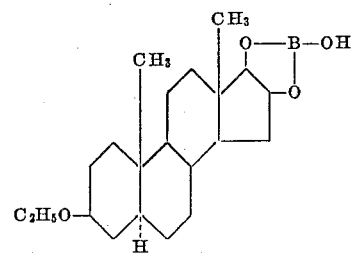

The starting material, 3β-ethoxy-5-androsten-17-one, was obtained by the method described by Huffman and Sadler in the "Journal of Organic Chemistry," pages 919–927 of volume 18 for the year 1953, using absolute ethanol as the exchange solvent with dehydroisoandrosterone toluenesulfonate.

A solution of 12.5 g. of 3β-ethoxy-5-androsten-17-one in 260 ml. of 95% ethanol was reduced under 18.5 p.s.i.g. hydrogen using 2.5 g. 5% palladium on carbon as catalyst. The solution was then filtered from the catalyst, 250 ml. water added, the solution concentrated by distillation to crystallization, and the resulting mixture refrigerated. The crude 3β-ethoxy-androstan-17-one was filtered and dried. Recrystallization from aqueous acetone yielded a product having a M.P. 116.5–117.5°.

21.2 g. of 3β-ethoxy-androstan-17-one were dissolved in a solution of 780 ml. of potassium tertiary butoxide in tertiary butyl alcohol (of a concentration of 4.4 g. of potassium in 180 ml. of anhydrous tertiary butyl alcohol) and to the well stirred solution were added 13.8 ml. of isoamyl nitrite and stirring continued for one hour. To the reaction were then added 25 ml. of 2-butanone and after stirring for an additional 30 minutes the solution was poured into 2,000 ml. of ice water and the resulting solution acidified with dilute sulfuric acid and the whole then diluted to five liters with additional ice water. The precipitate of 3β-ethoxy-16-oximino-androstan-17-one was collected by filtration, washed copiously with water, and the product dried in a vacuum desiccator over calcium chloride.

To a solution of 13.7 g. of 3β-ethoxy-16-oximino-androstan-17-one in 800 ml. of 50% aqueous acetic acid were added 29 g. of zinc dust and the resulting mixture heated at reflux for two hours. The reaction mixture was filtered from the zinc through glass wool, the residual filter cake of zinc was washed with an additional amount of hot 50% aqueous acetic acid and the combined filtrates were allowed to cool slowly, while adding 500 ml. of water, over a period of one hour to induce crystallization of the 3β-ethoxy-17β-hydroxy-androstan-16-one. The mixture was then refrigerated. The crystalline compound was collected on a filter and washed thoroughly with water.

A solution of 8.2 g. of 3β-ethoxy-17β-hydroxy-androstan-16-one in 200 ml. of absolute ethanol was cooled to 0° in an ice bath and 6.4 g. of sodium borohydride added. The reduction was allowed to proceed at 0° for one hour and then permitted to reach the ambient temperature over a period of two hours after which time acetone was added to destroy the excess sodium borohydride and the reaction mixture then diluted with 2,500 ml. chilled 5% sodium chloride solution. The crude precipitated product was filtered, washed copiously with water and dried. One crystallization from aqueous methanol yielded 5.52 g. of 3β-ethoxy-androstan-16β,17β-diol having a M.P. 161–163°.

To a solution of 1.0 g. of 3β-ethoxy-androstane-16β,17β-diol in 70 ml. of absolute ethanol and 50 ml. of anhydrous, thiophene-free benzene were added 10 g. of boric anhydride and the resulting mixture heated at reflux under anhydrous conditions for 37 hours in such a manner that the condensate was passed through anhydrous calcium sulfate before returning to the reaction. The reaction mixture was concentrated to one-third the original volume by distillation, cooled, extracted with 500 ml. of diethyl ether, the ether extract washed several times with 250 ml. portions of ice water and then dried over anhydrous sodium sulfate. Evaporation of the ether left a crystalline residue which after one crystallization from ethylene chloride-heptane (containing a few drops of pyridine) yielded 3β-ethoxy-androstane-16β,17β-diol cycloborate decomposing above 225°.

EXAMPLE 3

*Androstane-3β,16β,17β-triol 16,17-cycloborate*

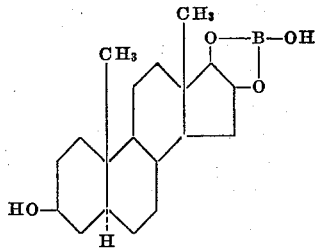

The starting material, androstane-3β,16β,17β-triol, can be prepared by the method described by Leeds, Fukushima, and Gallagher in the "Journal of the American Chemical Society," pages 2943–2948 of volume 76 for the year 1954 or by the method described by Huffman and Lott in the "Journal of the American Chemical Society," pages 719–728 of volume 71 for the year 1949.

To a solution of 0.45 g. of androstane-3β,16β,17β-triol in 50 ml. of absolute ethanol and 50 ml. of anhydrous thiophene-free benzene were added 4.0 g. of boric anhydride and the resulting mixture heated at reflux under anhydrous conditions for 14 hours in such a manner that the condensate was passed through anhydrous calcium sulfate before returning to the reaction. The reaction mixture was concentrated to one-third the original volume by distillation, cooled and extracted with 250 ml. of diethyl ether, the ether extract washed several times with 125 ml. portions of ice water and the ether dried over anhydrous sodium sulfate. Evaporation of the ether extract left a crystalline residue which after one crystallization from methylene chloride-hexane and two recrystallizations from ethylene chloride-heptane (containing a few drops of pyridine) yielded androstane-3β,16β,17β-triol 16β,17β-cycloborate decomposing above 405°.

I claim:
1. 3β-methoxy-androstane-16β,17β-diol cycloborate.
2. 3β-ethoxy-androstane-16β,17β-diol cycloborate.

References Cited by the Examiner

UNITED STATES PATENTS 2,381,073   8/1945   Miescher et al. _____ 260—397.5
3,005,839  10/1961   Leeson _____ 260—397.45

OTHER REFERENCES

Leeds et al., "Journal of the American Chem. Soc." (1954), pages 2943–2948 relied on.

Mateos et al., "Tetrahedron" (1963), pages 1051–1056 relied on.

LEWIS GOTTS, *Primary Examiner.*

ELBERT ROBERTS, *Examiner.*